United States Patent
Kim et al.

(10) Patent No.: US 9,823,485 B2
(45) Date of Patent: Nov. 21, 2017

(54) DISPLAY DEVICE COMPRISING A DEPTH PERCEPTION ADJUSTING UNIT THAT INCLUDES A DIRECTIONAL MIRROR AND A REFLECTIVE POLARIZER

(71) Applicant: ELECTRONICS AND TELECOMMUNICATIONS RESEARCH INSTITUTE, Daejeon (KR)

(72) Inventors: Hee Seung Kim, Gwangju (KR); Hyun Seo Kang, Gwangju (KR); Sei Hyoung Lee, Gwangju (KR); Soo Yong Jung, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/209,925

(22) Filed: Jul. 14, 2016

(65) Prior Publication Data

US 2017/0146807 A1 May 25, 2017

(30) Foreign Application Priority Data

Nov. 24, 2015 (KR) ........................ 10-2015-0165035

(51) Int. Cl.
*G02F 1/1335* (2006.01)
*F21V 8/00* (2006.01)
(Continued)

(52) U.S. Cl.
CPC ........... *G02B 27/26* (2013.01); *G02B 6/0038* (2013.01); *G02F 1/13363* (2013.01); *G02F 1/133536* (2013.01); *G02F 2001/133638* (2013.01)

(58) Field of Classification Search
CPC .............. G02F 2001/133638; G02F 1/133536
See application file for complete search history.

(56) References Cited

U.S. PATENT DOCUMENTS

| 8,427,606 B2 | 4/2013 | Chung et al. |
| 2008/0231689 A1* | 9/2008 | Larson ................. G02B 27/144 348/51 |

(Continued)

FOREIGN PATENT DOCUMENTS

| KR | 10-2007-0104213 | 10/2007 |
| KR | 10-2012-0066409 | 6/2012 |
| KR | 10-2015-0058637 | 5/2015 |

OTHER PUBLICATIONS

Emma Walton et al., "P-74: Seeing Depth from a Single LCD"; SID 09 Digest, Jun. 2009, pp. 1395-1398.

*Primary Examiner* — Paul Lee
(74) *Attorney, Agent, or Firm* — Kile Park Reed & Houtteman PLLC

(57) ABSTRACT

A display device includes a display panel, and a depth perception adjusting unit for adjusting a depth perception, based on polarization characteristics of light output from the display panel, wherein the depth perception adjusting unit includes a directional mirror and a reflective polarizer. Thus, the display device is implemented such that the directional mirror transmits or reflects light depending on an advancing direction of the light. Accordingly, any crosstalk phenomenon does not occur, and a depth perception can be adjusted without any loss of brightness efficiency.

14 Claims, 11 Drawing Sheets

(51) Int. Cl.
*G02B 27/26* (2006.01)
*G02F 1/13363* (2006.01)

(56) References Cited

U.S. PATENT DOCUMENTS

| | | |
|---|---|---|
| 2012/0146885 A1 | 6/2012 | Jung |
| 2013/0135722 A1* | 5/2013 | Yokoyama ............. G02B 27/26 |
| | | 359/465 |
| 2013/0155502 A1 | 6/2013 | Kwak et al. |
| 2013/0321718 A1* | 12/2013 | Huang ............... H04N 13/0418 |
| | | 349/5 |
| 2015/0138200 A1 | 5/2015 | Park et al. |
| 2015/0138486 A1 | 5/2015 | Lee |

* cited by examiner

DISPLAY DEVICE COMPRISING A DEPTH PERCEPTION ADJUSTING UNIT THAT INCLUDES A DIRECTIONAL MIRROR AND A REFLECTIVE POLARIZER

CROSS-REFERENCE TO RELATED APPLICATION

The present application claims priority to Korean patent application number 10-2015-0165035 filed on Nov. 24, 2015, the entire disclosure of which is incorporated herein in its entirety by reference.

BACKGROUND

1. Field

An aspect of the present disclosure relates to a display device, and more particularly, to a display device capable of implementing three-dimensional images.

2. Description of the Related Art

There have been developed display technologies in which viewers can view three-dimensional images without their glasses. Autostereoscopic three-dimensional display technologies may be classified into multi-view display technologies, integral imaging display technologies, volumetric display technologies, holographic display technologies, and the like.

A layered display technology is used as one of the volumetric display technologies. The layered display technology is a technology for providing a three-dimensional effect by adjusting the ratio of brightnesses of images displayed on several display panels. However, the technology provides a depth perception corresponding to a space between the panels, and therefore, the depth perception is limited depending on the size of a display device.

SUMMARY

Embodiments provide a display device having improved brightness efficiency.

Embodiments also provide a display device in which a crosstalk phenomenon does not occur.

According to an aspect of the present disclosure, there is provided a display device including: a display panel; and a depth perception adjusting unit for adjusting a depth perception, based on polarization characteristics of light output from the display panel, wherein the depth perception adjusting unit includes: a directional mirror including a transmission surface facing the display panel and a reflection surface located at the opposite side of the transmission surface; and a reflective polarizer for transmitting linear polarization light in a first direction therethrough and reflecting linear polarization light in a second direction perpendicular to the first direction toward the reflection surface of the directional mirror, wherein the directional mirror transmits light incident onto the transmission surface therethrough and reflects light incident onto the reflection surface.

The display device may further include: a directional light source; and a light guide for guiding light emitted from the directional light source to the display panel such that the light is vertically incident onto the display panel.

The light guide may include: a substrate; a lattice layer having a lattice surface facing the display panel; and a buffer layer provided between the substrate and the lattice layer. The directional light source may be disposed to face a side portion of the lattice layer, and the light emitted from the directional light source may be incident at the side portion of the lattice layer to be output to the lattice surface.

The depth perception adjusting unit may further include: a first quarter wave plate provided between the directional mirror and the display panel; and a second quarter wave plate provided between the directional mirror and the reflective polarizer.

A fast axis of the first quarter wave plate may be aligned with a slow axis of the second quarter wave plate.

According to another aspect of the present disclosure, there is provided a display including: a display panel; and a depth perception adjusting unit for adjusting a depth perception, based on polarization characteristics of light output from the display panel, wherein the depth perception adjusting unit includes: a directional mirror including a transmission surface facing the display panel and a reflection surface located at the opposite side of the transmission surface; a reflective polarizer for transmitting linear polarization light in a first direction therethrough and reflecting linear polarization light in a second direction perpendicular to the first direction toward the reflection surface of the directional mirror; and a polarization modulating panel provided between the directional mirror and the display panel, the polarizing modulating panel rotating a polarization direction of the light output from the display panel to a predetermined angle, wherein the directional mirror transmits light incident onto the transmission surface therethrough and reflects light incident onto the reflection surface.

The display device may further include a controller for controlling the display panel such that the polarization direction is rotated to the predetermined angle when the light output from the display panel is transmitted through the polarization modulating panel.

The controller may control a voltage applied to the polarization modulating panel such that the predetermined angle is determined between 0 degree to 90 degrees.

The light output from the display panel may include linear polarization light.

The controller may control the display panel such that the polarization direction of the light output from the display panel has a predetermined direction between the first and second directions while the light output from the display panel is being transmitted through the display panel.

When it is predetermined that the light output from the display panel is recognized at a position of the display panel, the controller may control the display panel such that the polarization direction of the light output from the display panel corresponds to the first direction.

When it is predetermined that the light output from the display panel is recognized at a position distant backward from the position of the display panel, the controller may control the display panel such that the polarization direction of the light output from the display panel is rotated by a predetermined angle in the second direction within a range of over 0 degree and 90 degrees or less.

The depth perception adjusting unit may include: a first quarter wave plate provided between the directional mirror and the display panel; and a second quarter wave plate provided between the directional mirror and the reflective polarizer. A fast axis of the first quarter wave plate may be aligned with a slow axis of the second quarter wave plate.

The reflective polarizer and the second quarter wave plate may be spaced apart from each other at a predetermined distance.

The display panel may include a liquid crystal display panel.

Frame rates of the display panel and the polarization modulating panel may be the same and synchronized with each other.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
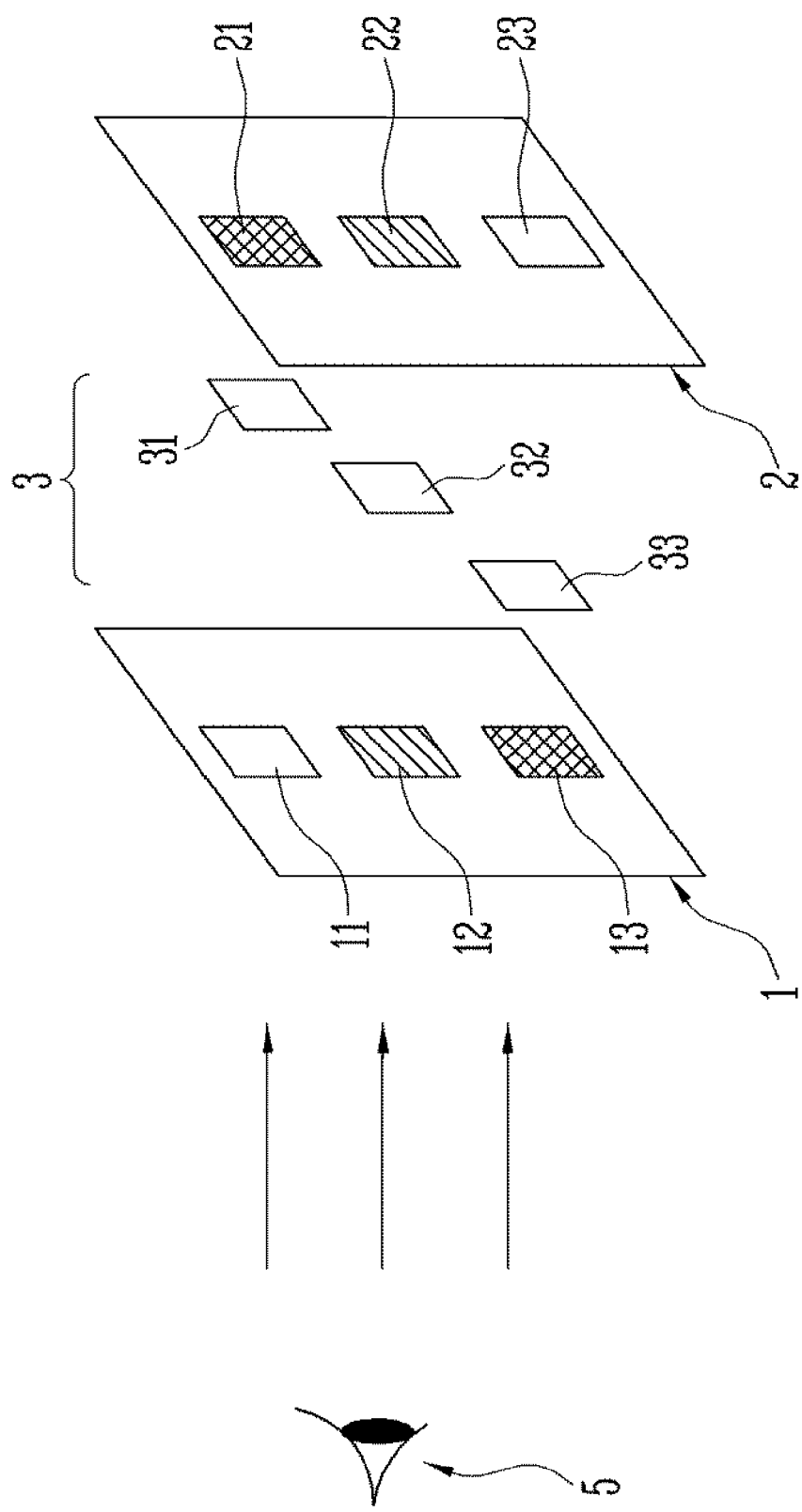
FIG. 1 is a conceptual view briefly illustrating an image implementation principle of a layered display device.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. Throughout the drawings, like elements are designated by like reference numerals.

FIG. 1 is a conceptual view briefly illustrating an image implementation principle of a layered display device. Referring to FIG. 1, a transparent front panel 1 and a transparent rear panel 2 are provided, and a stereoscopic image 3 is implemented between the front and rear panels 1 and 2. As the brightnesses of portions of each image in the front and rear panels 1 and 2 are different from each other, a depth perception is provided, thereby implementing the stereoscopic image 3.

When assuming that upper, middle, and lower images exist as portions of an image, the brightness of an upper image 11 of the front panel 1 is adjusted to 0% and the brightness of an upper image 21 of the rear panel 2 is adjusted to 100%, so that an upper stereoscopic image 31 can be viewed as an image formed on the rear panel 2. The brightness of a lower image 13 of the front panel 1 is adjusted to 100% and the brightness of a lower image 23 of the rear panel 2 is adjusted to 0%, so that a lower stereoscopic image 33 can be viewed as an image formed on the front panel 1. If both the brightness of a middle image 12 of the front panel 1 and the brightness of a middle image 22 of the rear panel 2 are adjusted to 50%, a middle stereoscopic image 32 can be viewed as an image formed between the front and rear panels 1 and 2.

In this manner, the ratio of brightnesses of images of each of the front and rear panels 1 and 2 is adjusted, thereby providing a depth perception.

Figure 2:
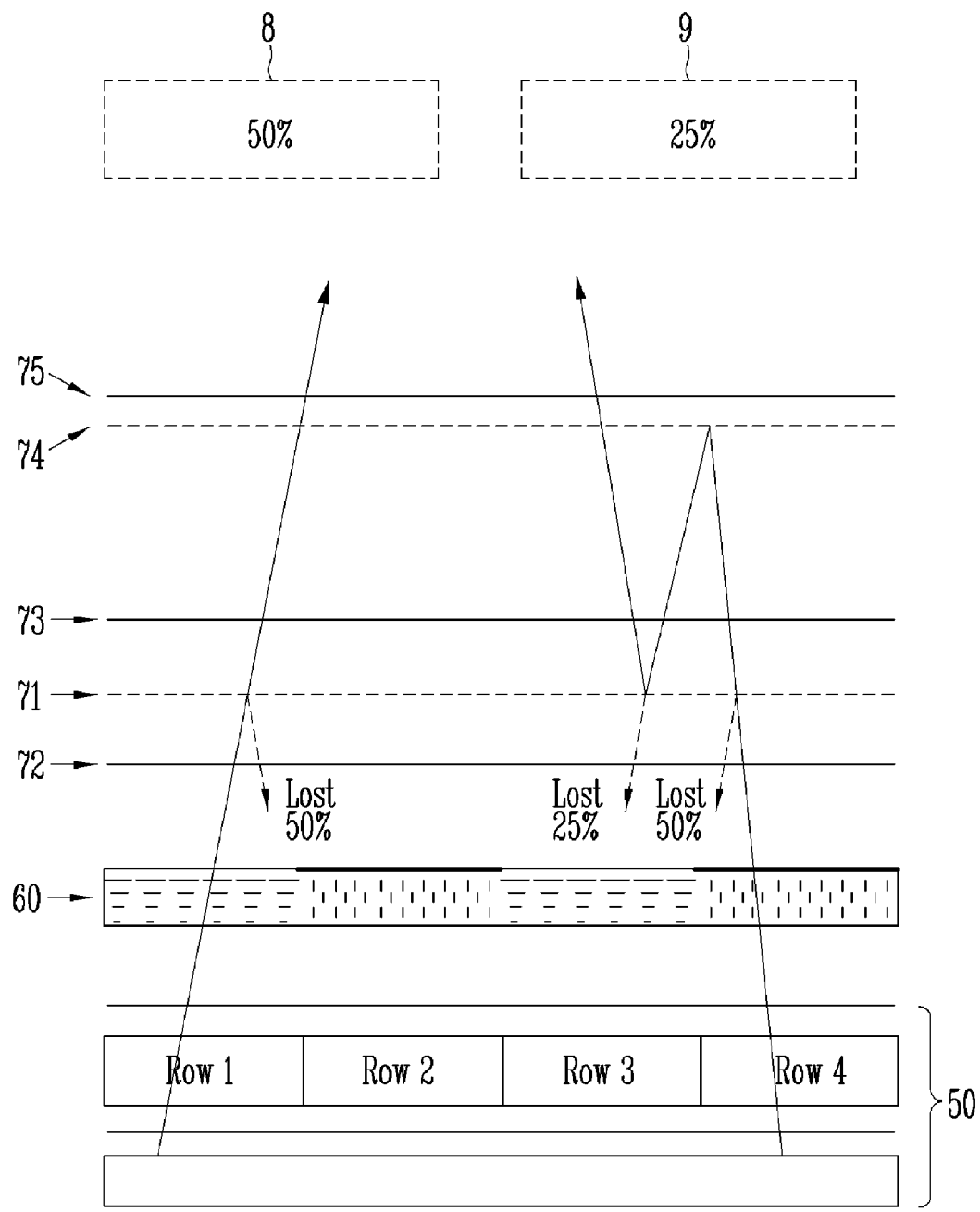
FIG. 2 is a conceptual view illustrating bright loss in a structure "Seeing Depth from a Single LCD."

Emma Walton, et al. have presented a technique for providing a depth perception using a single display panel and polarization characteristics in a paper entitled as "Seeing Depth from a Single LCD," SID 2009 Digest, Volume 40/Issue 1, page 1395-1398, June 2009. Referring to FIG. 2, the structure proposed by Emma Walton, et al. includes a standard LCD panel 50, a liquid crystal (LD) TN switch cell 60, a partial mirror 71, quarter wave retarders 72 and 73, a reflective polarizer 74, and an absorbing polarizer 75, to generate an upper image 8 and a lower image 9.

In the structure proposed by Emma Walton, et al., the partial mirror that transmits about 80% of light transmitted through the structure and reflects about 50% of the light transmitted through the structure is used. Therefore, the brightness of the upper image 8 is lost by 50% and the brightness of the lower image 9 is lost by 75%. That is, as the partial mirror 71 is used, the brightness efficiency of an image is considerably lowered. In addition, when information on images output from the standard LCD panel 50 is reflected while being spread in a front direction, the images advance through different paths. Therefore, crosstalk occurs in a finally generated three-dimensional image, and the range of expressible depth perceptions is also limited.

Hereinafter, exemplary embodiments of the present disclosure will be described below in detail with reference to the accompanying drawings such that those skilled in the art to which the present disclosure pertains can easily practice the present invention.

Figure 3:
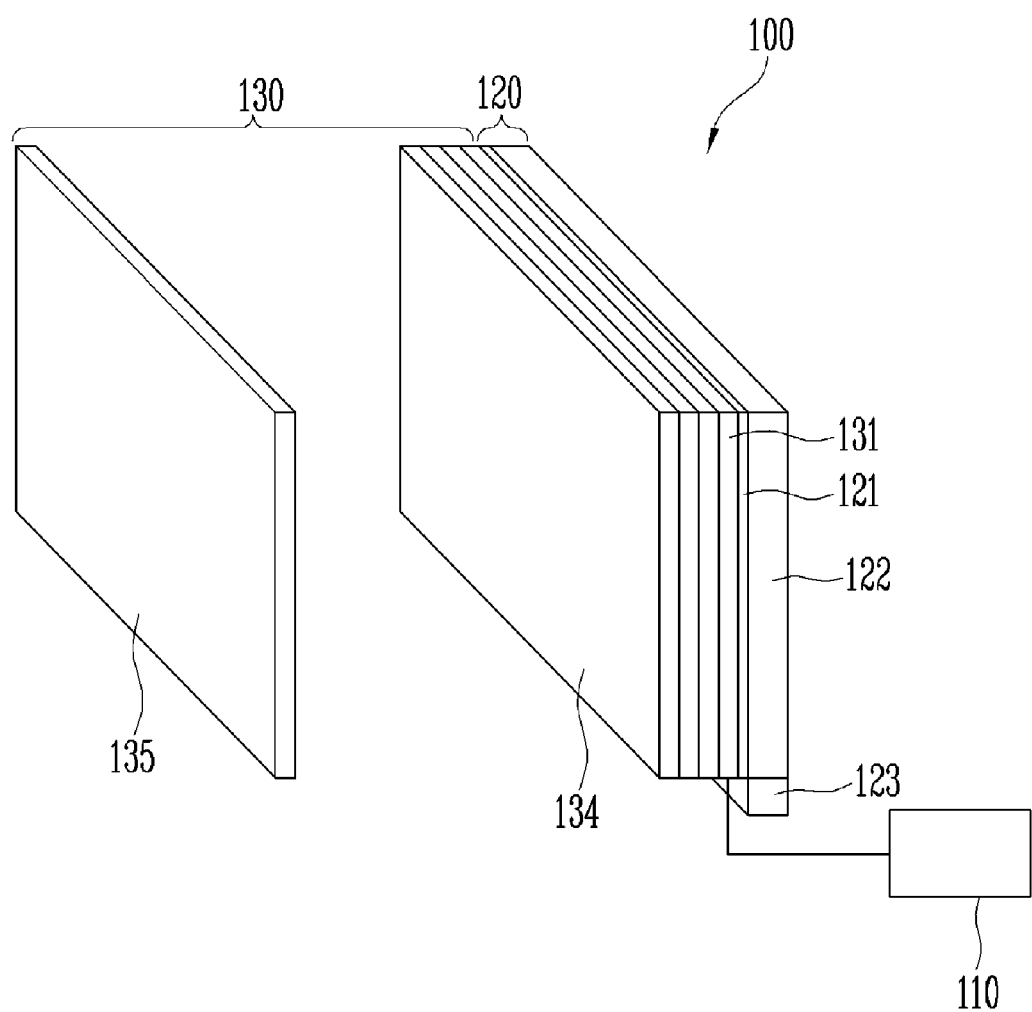
FIG. 3 is a schematic configuration view of an embodiment of the present disclosure.
Figure 4:
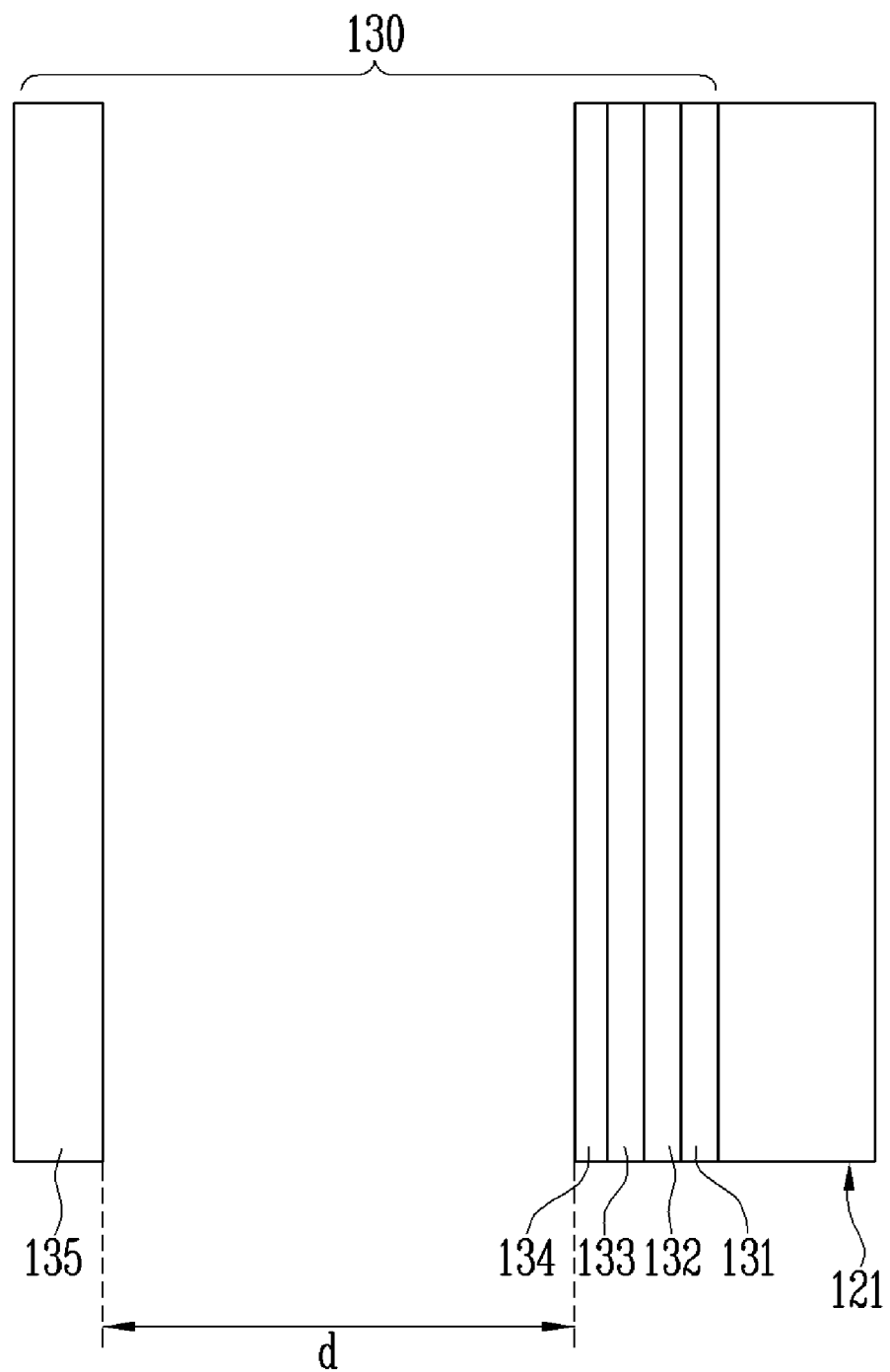
FIG. 4 is a side view of the embodiment of FIG. 3.
Figure 5:
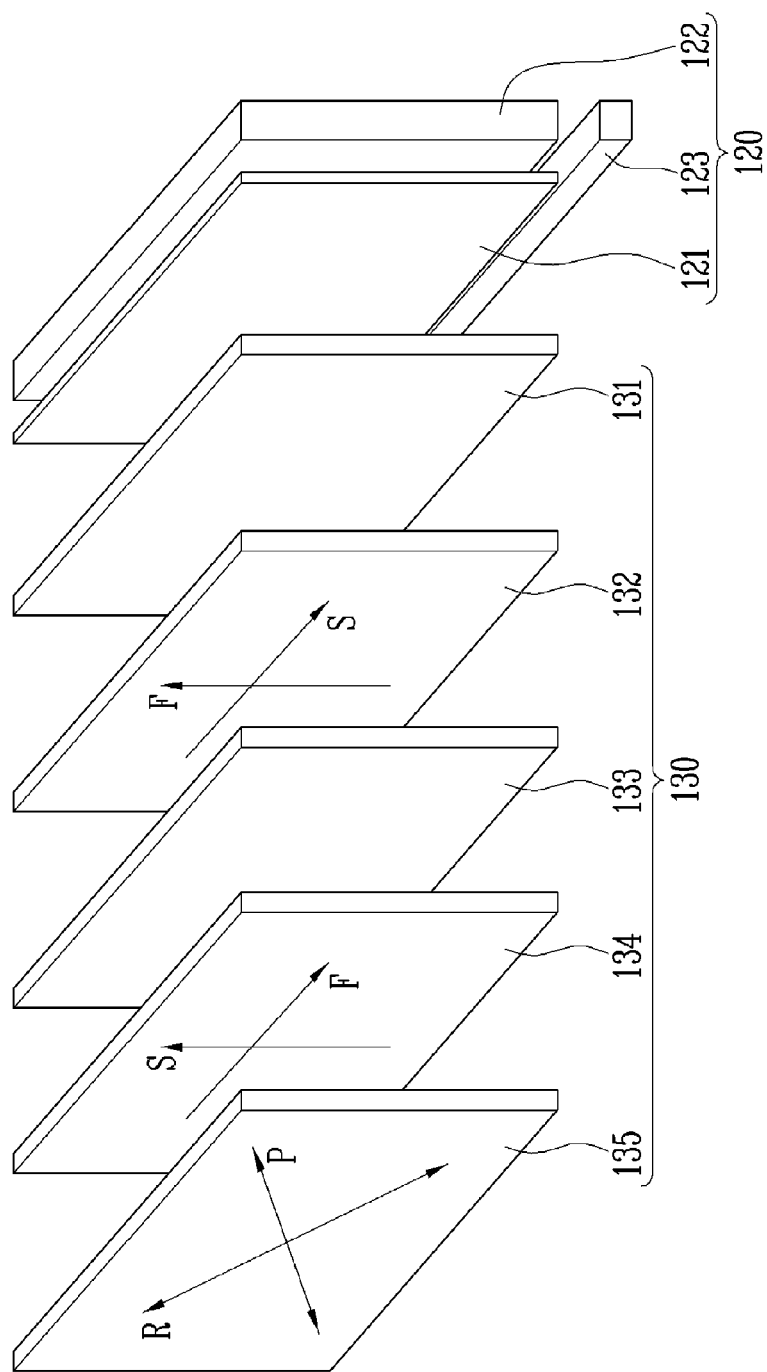
FIG. 5 is an exploded perspective view of the embodiment of FIG. 3.

FIG. 3 is a schematic configuration view of a display device according to an embodiment of the present disclosure. FIG. 4 is a side view of a display panel and a depth perception adjusting unit, provided in the embodiment of FIG. 3. FIG. 5 is an exploded perspective view of the embodiment of FIG. 3. The display device 100 according to the embodiment of the present disclosure includes an image providing unit 120 for providing a planar image, a depth perception adjusting unit 130 for adjusting a depth perception of the planar image, and a controller 110 for controlling the depth perception adjusting unit 130 to adjust the depth perception.

The image providing unit 120 includes a display panel 121 for displaying images thereon and a backlight unit 122 and 123 for directing backlight onto the display panel 121. The backlight unit 122 and 123 includes a light source 123 and a light guide 122 for guiding light of the light source 123 to the display panel 121.

The light source 123 is disposed toward a side portion of the light guide 122 and outputs light. Light output from the light source 123 is coherent and directional. For example, the light source 123 may be a laser. Also, the light source 123 may be implemented as a linear light source.

Figure 6:
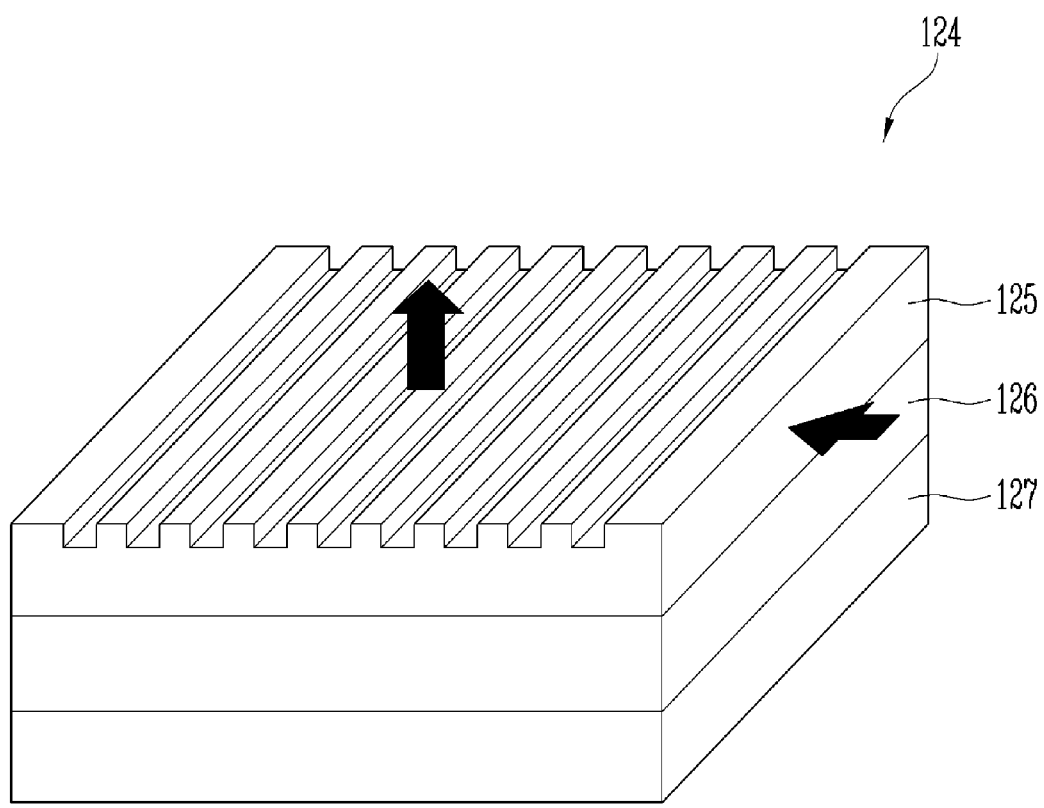
FIG. 6 is a perspective view illustrating an embodiment of a light guide provided in the embodiment of FIG. 3.
Figure 7:
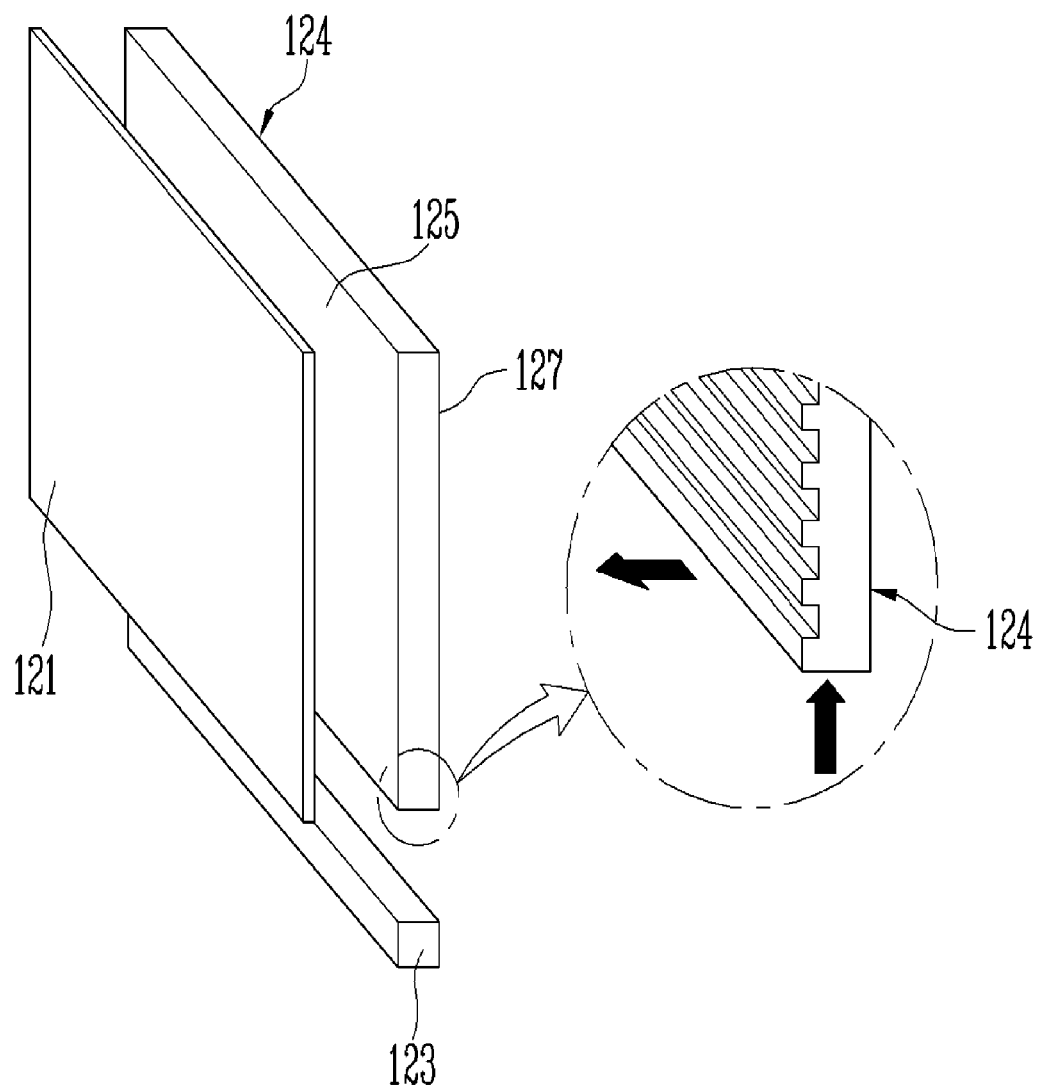
FIG. 7 is a perspective view illustrating when the light guide of the embodiment of FIG. 6 guides light output from a light source to a display panel.

The light guide 122 guides light output from the light source 125 to be vertically incident onto the display panel 121. An embodiment 124 of the light guide 122 is illustrated in FIG. 6. FIG. 7 is an exploded perspective view of an image providing unit provided with the light guide 124 of the embodiment of FIG. 6.

The light guide 124 according to the embodiment includes a substrate 127, a buffer layer 126, and a lattice layer 125. The buffer layer 126 is layered on the substrate 127. The buffer layer 126 may allow light incident onto the lattice layer 125 to be emitted from a surface provided with a lattice without any loss. The buffer layer 126 may be formed of a material having a lower refractive index than a material forming the lattice layer 125.

The lattice layer 125 is stacked on the buffer layer 126, and the lattice is provided to a surface opposite to a surface facing the buffer layer 126. In the lattice layer 125, the surface provided with the lattice faces the display panel 121. Referring to FIGS. 6 and 7, in the lattice layer 125, light incident onto a side portion of the lattice layer 125 is emitted to the surface provided with the lattice. In FIGS. 6 and 7, light incident onto the lattice layer 125 and light emitted from the lattice layer 125 are indicated by arrows.

The lattice provided in the lattice layer 125 is a lattice pattern extending in parallel to a corner line of the side portion onto which light is incident, the lattice pattern being periodically disposed along a direction perpendicular to the extending direction. The lattice provided in the lattice layer 125 may be a lattice pattern having a fine lattice period (lattice constant) of about 300 nm to 500 nm. The light incident onto the side portion of the lattice layer 125 meets the lattice pattern, to be emitted to the display panel 121 due to a diffraction phenomenon.

The wavelength of light from the light source 123, the lattice period of the lattice pattern, and the refractive index of the lattice layer 125 may be determined such that the light output from the lattice layer 125 is vertically incident on a plane of the display panel 121.

Figure 9:
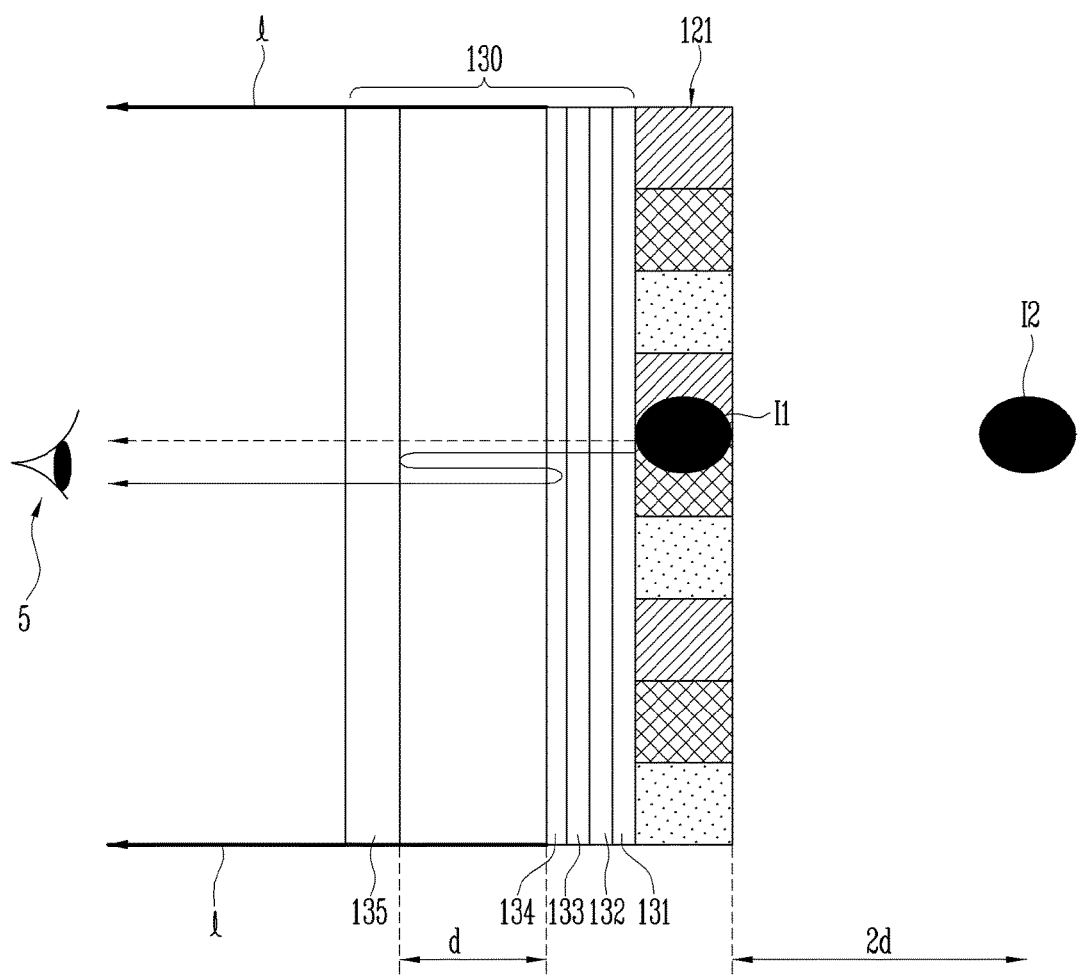
FIG. 9 is a side view illustrating an operating state of the embodiment of FIG. 3.

According to the above-described configuration, parallel light is output from the backlight unit, and thus any crosstalk phenomenon does not occur. In FIG. 2, light from the standard LCD panel 50 is output while being spread, and therefore, light reflected by the partial mirror 71 causes a crosstalk phenomenon. However, parallel light is output from the backlight unit of the present disclosure, and thus any crosstalk phenomenon does not occur even after light is reflected in the depth perception adjusting unit. Referring to FIG. 9, since parallel light is output from the backlight unit of the present disclosure, light 1 incident onto the depth perception unit is not spread. Thus, any crosstalk phenomenon does not occur even when light is reflected to generate Image 2 I2 (solid-line arrow).

The display panel 121 outputs light incident from the light guide 122 in the form of linear polarization light. The display panel 121 may be a liquid crystal display panel. However, the present disclosure is not limited thereto. The detailed configuration of the liquid crystal display panel is known in the art, and therefore, its detailed description will be omitted.

The depth perception adjusting unit 130 adjusts a depth perception based on polarization characteristics of light output from the display panel 121. Image information output as a two-dimensional image on the display panel 121 may be implemented as a three-dimensional image by the depth perception adjusting unit 130.

The depth perception adjusting unit 130 includes a polarization modulating panel 131, first and second quarter wave plates 132 and 134, a directional mirror 133, and a reflective polarizer 135.

The polarization modulating panel 131 is stacked on the display panel 121 and light output from the display panel 121 is incident toward the polarization modulating panel 131. The first quarter wave plate 132, the directional mirror 133, and the second quarter wave plate 134 are sequentially stacked on the polarization modulating panel 131. The reflective polarizer 135 and the second quarter wave plate 134 are spaced apart from each other at a predetermined distance d.

One surface of the polarization modulating panel 131 faces the display panel 121, and the opposite surface of the polarization modulating panel 131 faces the first quarter wave plate 132. The polarization modulating panel 131 selectively changes the linear polarization direction of light incident from the display panel 121. The polarization modulating panel 131 is synchronized with the display panel 121, and has the same frame rate as the display panel 121. For example, the frame rate of the polarization modulating panel 131 and the display panel 121 may be 60 Hz. As an embodiment, the polarization modulating panel 131 may be a liquid crystal display panel having no polarizing filter and color filter.

The controller 110 controls a voltage applied to the polarization modulating panel 131 such that the linear polarization direction of light incident onto the polarization modulating panel 131 is selectively changed. For example, if the linear polarization direction of the light incident onto the polarization modulating panel 131 from the display panel 121 is as it is when the controller 110 controls the applied voltage such that a black image is output on the polarization modulating panel 131, the linear polarization direction of the light incident onto the polarization modulating panel 131 from the display panel 121 when the controller 110 controls the applied voltage such that a white image is output on the polarization modulating panel 131 is rotated by 90 degrees.

In this manner, the voltage applied to the polarization modulating panel 131 is controlled, so that the linear polarization direction of light transmitted through the polarization modulating panel 131 is rotated by a value determined in a range between 0 degree and 90 degrees, thereby adjusting a depth perception. This will be described later with reference to FIG. 9.

Figure 8:
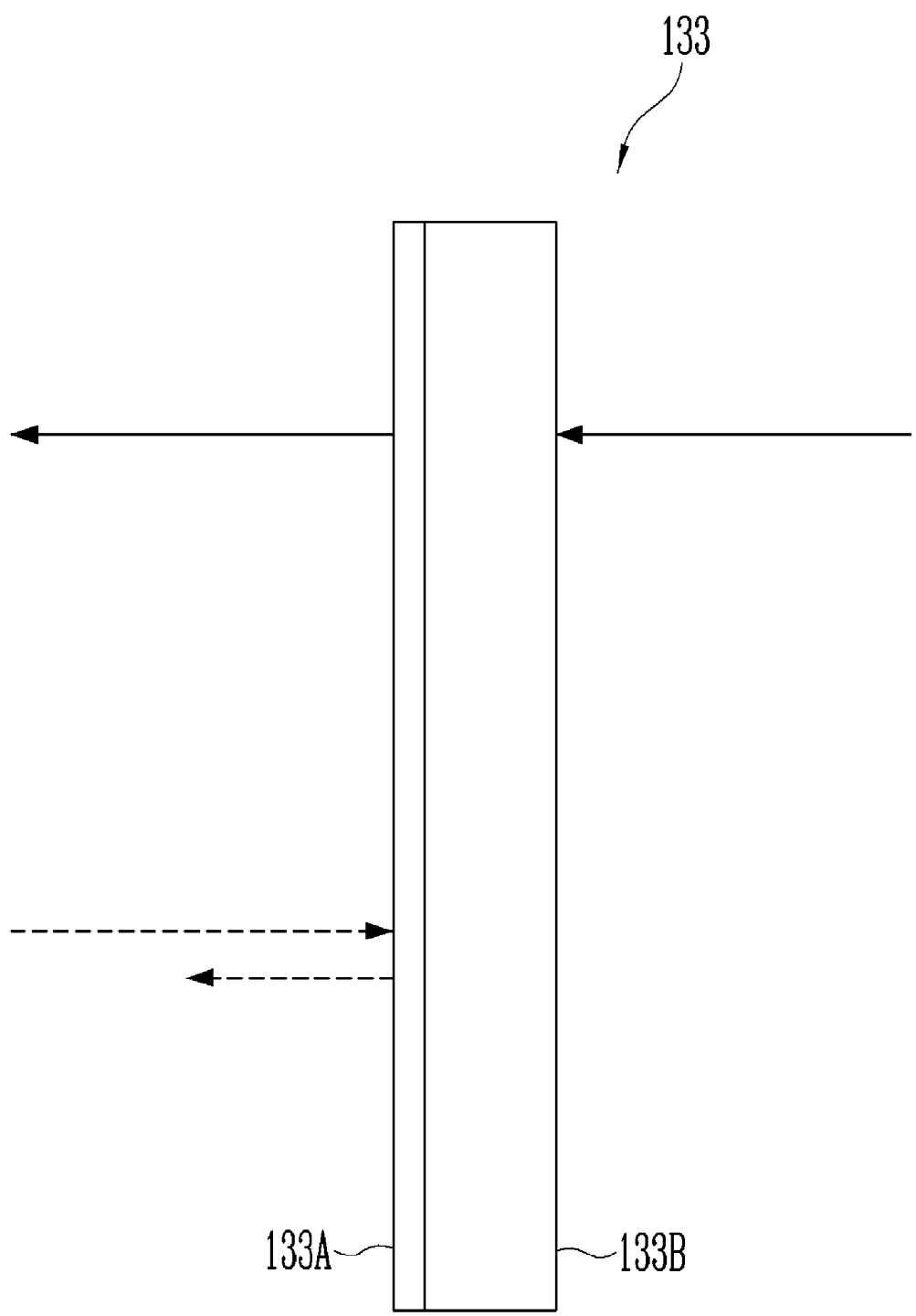
FIG. 8 is a conceptual view illustrating a principle of a directional mirror provided in the embodiment of FIG. 3.

The directional mirror 133 is provided between the first and second quarter wave plates 132 and 134. The directional mirror 133 is a mirror that transmits or reflects incident light depending on an advancing direction of the incident light. Referring to FIG. 8, the directional mirror 133 includes a reflection surface 133A reflecting incident light and a transmission surface 133B provided at the opposite side of the reflection surface 133A to transmit incident light. The directional mirror 133 reflects almost all light (dotted-line arrow of FIG. 8) incident toward the reflection surface 133A. The directional mirror 133 transmits almost all light (solid-line arrow of FIG. 8) incident toward the transmission surface 133B.

The first and second quarter wave plates 132 and 134 are layered with the directional mirror 133 interposed therebetween. The first and second quarter wave plates 132 and 134 are arranged such that a fast axis of any one wave plate and a slow axis of the other wave plate correspond to each other. Referring to FIG. 5, a fast axis (F axis) of the first quarter wave plate 132 is aligned with a slow axis (S axis) of the second quarter wave plate 134, and a slow axis (S axis) of the first quarter wave plate 132 is aligned with a fast axis (F axis) of the second quarter wave plate 134.

The reflective polarizer 135 is disposed to be spaced apart from the first quarter wave plate 132. Referring to FIG. 5, the reflective polarizer 135 transmits linear polarization light in a first direction (P axis) and reflects linear polarization light in a second direction (R axis) perpendicular to the first direction. The linear polarization light in the second direction is reflected toward the second quarter wave plate 134 and the directional mirror 133 by the reflective polarizer 135.

When the polarization direction of linear polarization light is placed at an angle between the first and second directions, the reflective polarizer 135 partially transmits and partially reflects the linear polarization light. For example, in a case where linear polarization light has a polarization direction of 45 degrees when it is defined that the P axis is set to 0 degree and the R axis is set to 90 degrees, ½ of the linear polarization light is reflected to the second quarter wave plate 134, and the other ½ of the linear polarization light is transmitted through the reflective polarizer 135 as it is.

The reflection surface 133A of the directional mirror 133 faces the second quarter wave plate 134, and the transmission surface 133B of the directional mirror 133 faces the first quarter wave plate 132. Therefore, the linear polarization light reflected from the reflective polarizer 135 is incident toward the reflection surface 133A of the directional mirror 133 by being transmitted through the second quarter wave plate 134, and then reflected from the reflection surface 133A.

According to the above-described configuration, the linear polarization direction of light output from the display panel 121 is selectively changed by the polarization modulating panel 131, to enable the linear polarization light to be transmitted through the reflective polarizer 135 as it is or to be reflected to the directional mirror 133 and then transmitted through the reflective polarizer 135, thereby adjusting a depth perception. Since all light is reflected or transmitted by the directional mirror 133, there is no loss of brightness efficiency. This will be described in detail below.

Figure 10:
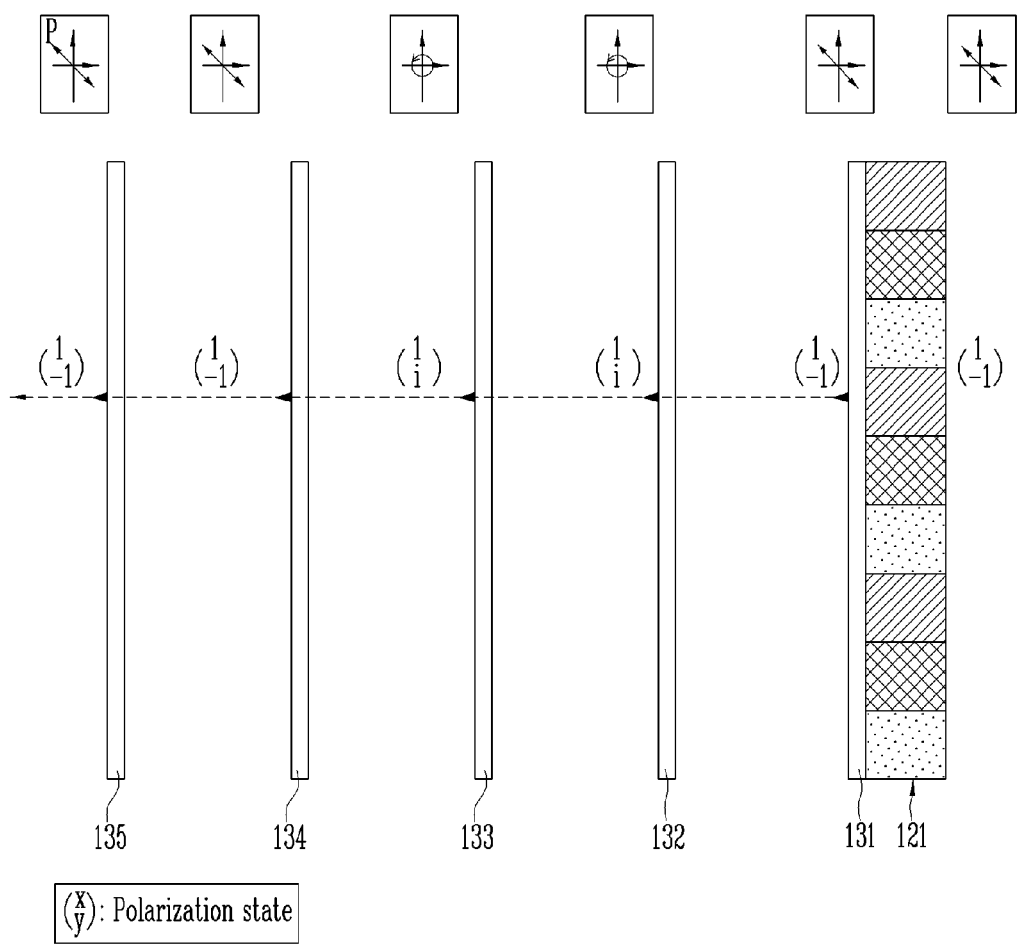
FIG. 10 is a view illustrating a depth perception adjusting principle based on a polarization state of Image 1 of FIG. 9.
Figure 11:
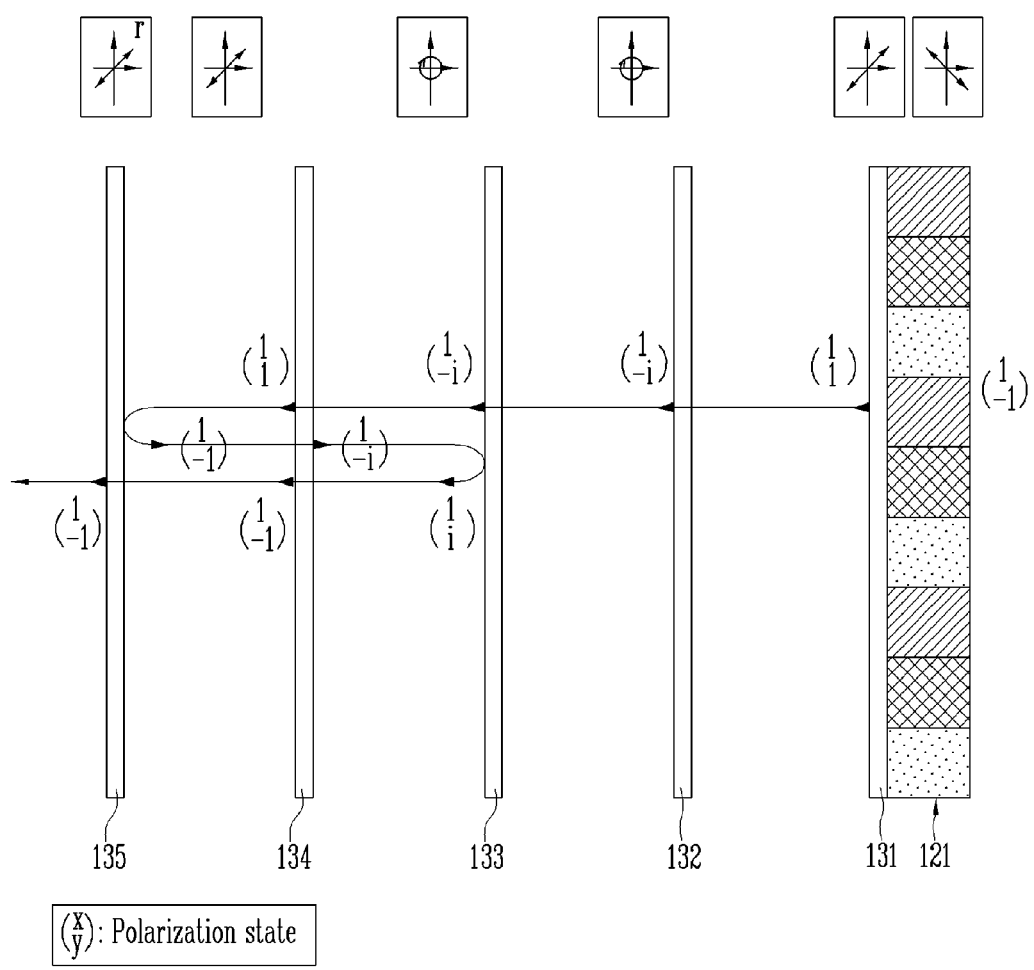
FIG. 11 is a view illustrating a depth perception adjusting principle based on a polarization state of Image 2 of FIG. 9.

FIG. 9 is a side view illustrating a principle of adjusting a depth perception according to the configuration of the embodiment of FIG. 3. FIG. 10 is a view illustrating a polarization state of light for implementing Image 1. FIG. 11 is a view illustrating a polarization state of light for implementing Image 2. In FIGS. 9 to 11, it is conceptually illustrated that the display panel 121 includes a plurality of pixels (denoted by comb, check, and dot patterns of FIG. 9).

A case where an observer 5 recognizes that light output from the same pixel of the display panel 121 is located at a position of the display panel 121 is defined as Image 1 I1, and a case where the observer 5 recognizes that the light output from the same pixel of the display panel 121 is located at a position distant backward by 2 d from that of the display panel 121 is defined as Image 2 I2. That is, according to the embodiment of the present disclosure, a depth perception can be adjusted such that depth perception of light output from the same pixel of the display panel 121 is differently recognized, such as Image 1 I1 or Image 2 I2.

A case where the polarization direction of light emitted from the display panel 121 is the same as the first direction as the direction of the P axis of the reflective polarizer 135 will be described as an example.

As the linear polarization direction of light emitted from the display panel 121 is maintained or changed by controlling a voltage applied to the polarization modulating panel 131, the observer 5 can recognize that an image is located at any one position between the display panel 121 and a position distant backward by 2 d from the display panel 121.

The advancing path and advancing direction of light when the display panel 121 is controlled such that the observer 5 recognizes the light as Image 1 I1 are indicated by a dotted-line arrow. The advancing path and advancing direction of light when the display panel 121 is controlled such that the observer 5 recognizes the light as Image 2 I2 are indicated by a solid-line arrow.

For example, the controller 110 may control the linear polarization state of light output from the display panel 121 to be maintained even after the light is transmitted through the polarization modulating panel 131 by applying a first voltage to the polarization modulating panel 131. That is, if the first voltage is applied to the display panel 121, the polarization state of the light before the light is transmitted through the polarization modulating panel 131 is the same as that of the light after the light is transmitted through the polarization modulating panel 131.

Referring to FIG. 10, when assuming that linear polarization light of which polarization state is $$\begin{pmatrix} 1 \\ -1 \end{pmatrix}$$

is output from the display panel 121, the polarization state of linear polarization light transmitted through the polarization modulating panel 131 is $$\begin{pmatrix} 1 \\ -1 \end{pmatrix}.$$

The linear polarization light transmitted through the polarization modulating panel 131 is sequentially transmitted through the first quarter wave plate 132, the directional mirror 133, and the second quarter wave plate 134 and then becomes the same polarization state $$\begin{pmatrix} 1 \\ -1 \end{pmatrix}$$

as when the linear polarization light is output from the display panel 121. Since the polarization direction of the linear polarization light output from the display panel 121 is the same as the first direction, the linear polarization light is transmitted through the reflective polarizer 135 as it is. Thus, the observer 5 recognizes the linear polarization light output from the display panel 121 as Image 1 I1 in a ratio of brightness of 100%.

For example, the controller 110 may control the polarization direction of light output from the display panel 121 to be rotated by 90 degrees while being transmitted through the polarization modulating panel 131 by applying a second voltage to the polarization modulating panel 131. That is, if the second voltage is applied to the display panel 121, the polarization state of the light is changed while the light is being transmitted through the polarization modulating panel 131.

The light transmitted through the polarization modulating panel 121 is sequentially transmitted through the first quarter wave plate 132, the directional mirror 133, and the second quarter wave plate 134 and then is incident onto the reflective polarizer 135. Since the polarization direction of the light is rotated by 90 degrees by the polarization modulating panel 131, all of the light is reflected to the directional mirror 133 by the reflective polarizer 135.

When assuming that linear polarization light of which polarization state is $$\begin{pmatrix} 1 \\ -1 \end{pmatrix}$$

is output from the display panel 121, the polarization state of the linear polarization light transmitted through the polarization modulating panel 131 is $$\begin{pmatrix} 1 \\ 1 \end{pmatrix}.$$

The linear polarization light is transmitted through the second quarter wave plate 134 once while being reflected to the directional mirror 133 by the reflective polarizer 135, and is reflected from the directional mirror 133 to be again transmitted through the second quarter wave plate 134. That is, the linear polarization light is transmitted through the second quarter wave plate 134 twice until it is reflected from the reflective polarizer 135 and then again incident onto the reflective polarizer 135. After that, the polarization state of linear polarization light incident onto the reflective polarizer 135 is the same as $$\begin{pmatrix} 1 \\ -1 \end{pmatrix}$$

that is the polarization state of the linear polarization light output from the display panel 121.

Since the polarization direction of the linear polarization light output from the display panel 121 is the same as the first direction, the linear polarization light secondarily incident onto the reflective polarizer 135 is transmitted through the reflective polarizer 135 as it is. Thus, the observer 5 recognizes the linear polarization light output from the display panel 121 as Image 2 I2 in a ratio of brightness of 100%.

The observer 5 may recognize the linear polarization light output from the display panel 121 as an image located at any one position between the display panel 121 and a position distant backward by 2 d from the display panel 121. For example, when linear polarization of which polarization state is $$\begin{pmatrix} 1 \\ -1 \end{pmatrix}$$

is output from the display panel 121, the linear polarization light may be rotated by 45 degrees by controlling the polarization modulating panel 131.

Then, ½ of the linear polarization light transmitted through the polarization modulating panel 131 advances as indicated by the dotted-line arrow of FIG. 9, and the other ½ of the linear polarization light advances as the solid-line arrow of FIG. 9. Therefore, for the linear polarization light advancing as indicated by the dotted-line arrow, the ratio of brightness becomes ½ at the position of the display panel 121, and, for the linear polarization light advancing as indicated by the solid-line arrow, the ratio of brightness becomes ½ at the position distant by 2 d from the display panel 121. Thus, the observer 5 recognizes the corresponding linear polarization light as an image formed at a position distant by d from the display panel 121.

The present disclosure may be applied even when image information having a polarization state in the second direction that is the direction of the R axis of the reflective polarizer 135 is output from the display panel 121. In this case, the controller 110 may control a voltage applied to the polarization modulating panel 131 such that the polarization state of the image information is selectively changed.

According to the above-described configuration, it is possible to adjust, without any loss of brightness efficiency, a depth perception between the display panel 121 and a position distant, from the display panel, by two times greater than the spacing distance between the reflective polarizer 135 and the second quarter wave plate 134. Further, it is possible to reproduce images having different depth perceptions for every number of images per second by synchronizing the display panel 121 with the polarization modulating panel 131. Accordingly, stereoscopic images can be more vividly implemented.

According to the present disclosure, a depth perception can be adjusted without any loss of brightness efficiency, thereby easily implementing three-dimensional images.

Also, according to the present disclosure, two-dimensional images can be reproduced as well as three-dimensional images, and three-dimensional images recognizable without glasses can be reproduced.

Also, according to the present disclosure, one display panel is provided, so that it is possible to obtain a high computing speed.

Also, according to the present disclosure, it is possible to express a depth perception up to two times of the distance between the reflective polarizer and the directional mirror.

Also, according to the present disclosure, parallel light is output from the backlight unit, and thus any crosstalk phenomenon does not occur.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
   a display panel; and a depth perception adjusting unit for adjusting a depth perception, based on polarization characteristics of light output from the display panel, wherein the depth perception adjusting unit includes:

a directional mirror including a transmission surface facing the display panel and a reflection surface located at the opposite side of the transmission surface; and a reflective polarizer for transmitting linear polarization light in a first direction therethrough and reflecting linear polarization light in a second direction perpendicular to the first direction toward the reflection surface of the directional mirror, wherein the directional mirror transmits light incident onto the transmission surface therethrough and reflects light incident onto the reflection surface.

2. The display device of claim 1, further comprising:

a directional light source; and a light guide for guiding light emitted from the directional light source to the display panel such that the light is vertically incident onto the display panel.

3. The display device of claim 2, wherein the light guide includes:

a substrate;

a lattice layer having a lattice surface facing the display panel; and a buffer layer provided between the substrate and the lattice layer, wherein the directional light source is disposed to face a side portion of the lattice layer, and the light emitted from the directional light source is incident at the side portion of the lattice layer to be output to the lattice surface.

4. The display device of claim 1, wherein the depth perception adjusting unit further includes:

a first quarter wave plate provided between the directional mirror and the display panel; and a second quarter wave plate provided between the directional mirror and the reflective polarizer, wherein a fast axis of the first quarter wave plate is aligned with a slow axis of the second quarter wave plate.

5. A display device comprising:

a display panel; and a depth perception adjusting unit for adjusting a depth perception, based on polarization characteristics of light output from the display panel, wherein the depth perception adjusting unit includes:

a directional mirror including a transmission surface facing the display panel and a reflection surface located at the opposite side of the transmission surface;

a reflective polarizer for transmitting linear polarization light in a first direction therethrough and reflecting linear polarization light in a second direction perpendicular to the first direction toward the reflection surface of the directional mirror; and a polarization modulating panel provided between the directional mirror and the display panel, the polarizing modulating panel rotating a polarization direction of the light output from the display panel to a predetermined angle, wherein the directional mirror transmits light incident onto the transmission surface therethrough and reflects light incident onto the reflection surface.

6. The display device of claim 5, further comprising a controller for controlling the display panel such that the polarization direction is rotated to the predetermined angle when the light output from the display panel is transmitted through the polarization modulating panel.

7. The display device of claim 6, wherein the controller controls a voltage applied to the polarization modulating panel such that the predetermined angle is determined between 0 degree to 90 degrees.

8. The display device of claim 6, wherein the light output from the display panel includes linear polarization light.

9. The display device of claim 8, wherein the controller controls the display panel such that the polarization direction of the light output from the display panel has a predetermined direction between the first and second directions while the light output from the display panel is being transmitted through the display panel.

10. The display device of claim 9, wherein the controller:

when it is predetermined that the light output from the display panel is recognized at a position of the display panel, controls the display panel such that the polarization direction of the light output from the display panel corresponds to the first direction; and when it is predetermined that the light output from the display panel is recognized at a position distant backward from the position of the display panel, controls the display panel such that the polarization direction of the light output from the display panel is rotated by a predetermined angle in the second direction within a range of over 0 degree and 90 degrees or less.

11. The display device of claim 9, wherein the depth perception adjusting unit further includes:

a first quarter wave plate provided between the directional mirror and the display panel; and a second quarter wave plate provided between the directional mirror and the reflective polarizer, wherein a fast axis of the first quarter wave plate is aligned with a slow axis of the second quarter wave plate.

12. The display device of claim 11, wherein the reflective polarizer and the second quarter wave plate are spaced apart from each other at a predetermined distance.

13. The display device of claim 5, wherein the display panel includes a liquid crystal display panel.

14. The display device of claim 5, wherein frame rates of the display panel and the polarization modulating panel are the same and synchronized with each other.

* * * * *